T. PINSKE.
HALF HITCH SLING LOCK.
APPLICATION FILED JUNE 23, 1916.
1,222,025.
Patented Apr. 10, 1917.
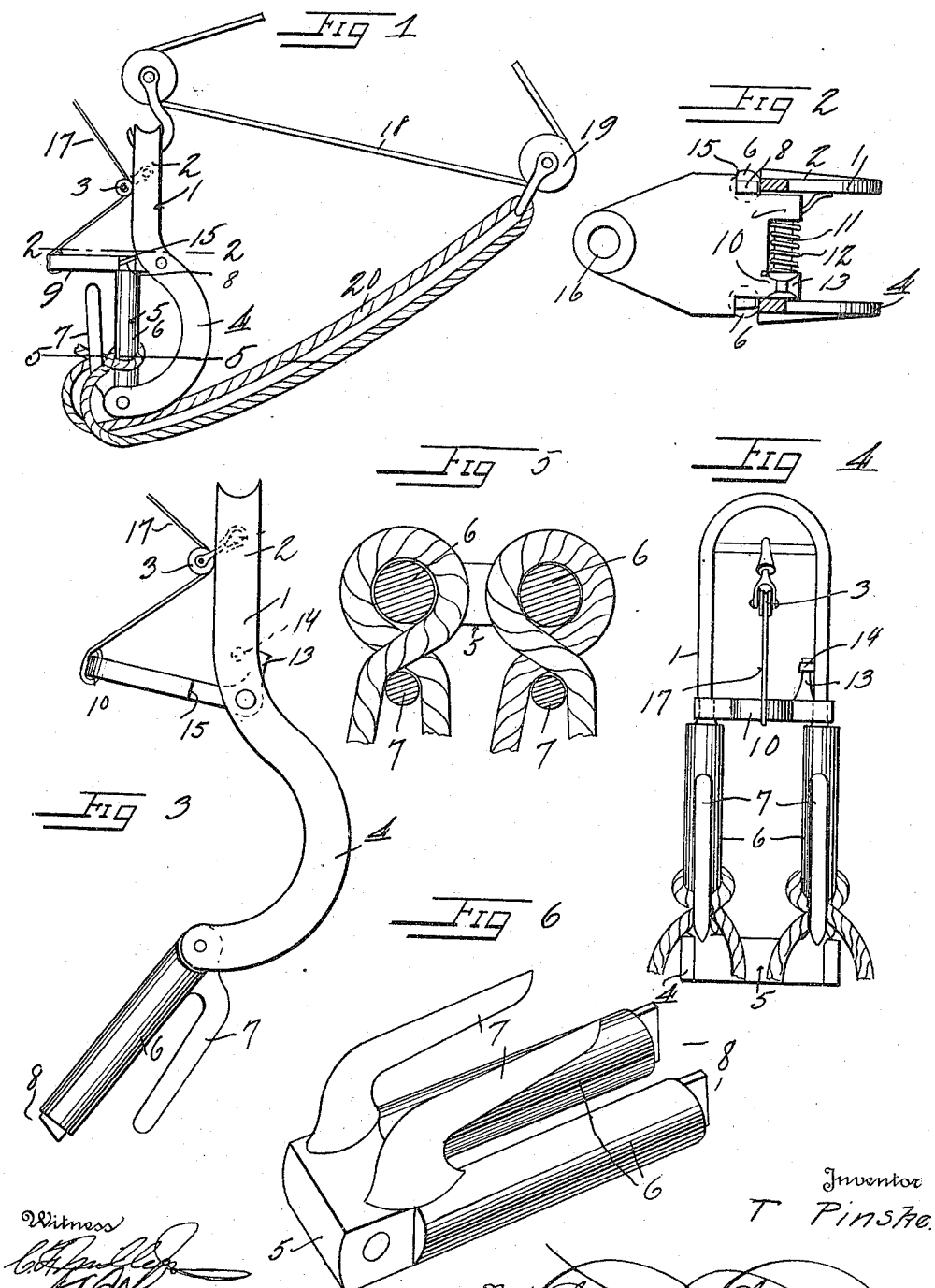
Inventor
T. Pinske.

UNITED STATES PATENT OFFICE.

THEODORE PINSKE, OF GARY, MINNESOTA.

HALF-HITCH SLING-LOCK.

1,222,025.  Specification of Letters Patent.  Patented Apr. 10, 1917.

Application filed June 23, 1916. Serial No. 105,460.

*To all whom it may concern:*

Be it known that I, THEODORE PINSKE, a citizen of the United States, residing at Gary, in the county of Norman, State of Minnesota, have invented certain new and useful Improvements in Half-Hitch Sling-Locks; and I do hereby declare the following to be a full, clear, and exact description of the invention, such as will enable others skilled in the art to which it appertains to make and use the same.

The present invention is directed to improvements in hay sling hooks, and has for its object to so construct a device of this character that the same can be easily tripped for releasing the sling rope.

A further object of the invention is to provide a hook of this character with a pair of fingers adapted to be engaged by the free ends of the sling rope in such a manner that when the hook is tripped the free ends of the rope will disengage the fingers so as to release the load.

With these and other objects, in view, this invention resides in the novel features of construction, formation, combination and arrangement of parts to be hereinafter more fully described, claimed and illustrated in the accompanying drawing, in which:—

Figure 1 is a side elevation of the device.

Fig. 2 is a sectional view on line 2—2 of Fig. 1.

Fig. 3 is a side elevation showing the device in its tripped position.

Fig. 4 is a front view.

Fig. 5 is a sectional view on line 5—5 of Fig. 1.

Fig. 6 is a detailed perspective view of the finger and arm supporting block.

Referring to the drawing 1 indicates the body of the hook, which is formed from a single strip of metal and is bent intermediate its ends to provide a yoke 2, the arms of which have rotatably engaged therebetween a pulley 3, the purpose of which will appear later.

The lower ends of the arms 2 terminate in arcuate bars 4 between the lower ends of which is pivotally connected a block 5 which is provided with arms 6 having carried thereby spaced fingers 7. The free ends of the arms 6 are provided with extensions 8, the purpose of which will appear later.

A trip 9 is provided and has its inner end provided with spaced lugs 10 which are pivotally connected between the lower ends of the arms 2 upon the shaft 11, said shaft having mounted thereon a coil spring 12 one terminal of which engages the trip, while the other terminal is secured to the adjacent arm 2, said spring serving to exert a downward pressure on the trip so as to hold the same in a normally horizontal position. To limit the downward swinging movement of the trip one of the lugs is provided with a projection 13 which is adapted to engage the stop 14 carried by one of the arms 2.

The trip is provided with shoulders 15 which are adapted to be engaged by the extensions 8 thereby holding the arms 6 in a vertical position and likewise the fingers 7.

The trip 9 is provided at its outer end with an eye 16 in which is secured one end of the trip rope 17, said rope being trained around the pulley 3, whereby when the rope is pulled the trip 9 will be swung upwardly.

A pulley block is connected to the upper end of the body 1 and has trained therearound the hoisting rope 18, said rope also passing around the pulley block 19 which supports the sling rope 20, said rope being looped upon the hook of the pulley block 19 and has its free end wrapped around the arms 6 and engaged between said arms and fingers 7.

Thus it will be seen that after the load has been lifted to the desired elevation that a pull on the rope 17 will raise the trip 9, thus releasing the arms 6 so that the same will swing downwardly, after which the rope engaged therewith will be released, and since the load is suspended on the sling rope 20 it will be released.

What is claimed is:—

A sling hook comprisng a body, a block pivoted to said body and including arms arranged in parallel relation, fingers extending from said arms longitudinally thereof, a shaft mounted in said body, a locking trip pivoted to said shaft and engaging said block to retain the same locked, a spring coiled about said shaft and engaging said trip to normally retain the same in locking position, means carried by said body and arranged in the path of movement of said trip to limit its movement in one direction, and a sling rope adapted to have its ends coiled about the arms and fingers of said block whereby to retain said rope in operative position when the block is locked.

In testimony whereof, I affix my signature, in the presence of two witnesses.

THEODORE PINSKE.

Witnesses:
GEO. V. LUDLOW,
N. B. BAGNE.